(12) United States Patent
McDonald, II et al.

(10) Patent No.: US 12,151,546 B2
(45) Date of Patent: *Nov. 26, 2024

(54) TOUCH RELEASE HANDLE

(71) Applicant: TRUCK ACCESSORIES GROUP, LLC, Elkhart, IN (US)

(72) Inventors: Ernest M. McDonald, II, Granger, IN (US); Eugene A. Dylewski, II, Granger, IN (US); Christopher David Mattison, South Bend, IN (US)

(73) Assignee: Leer Group, Elkhart, IN (US)

( * ) Notice: Subject to any disclaimer, the term of this patent is extended or adjusted under 35 U.S.C. 154(b) by 375 days.

This patent is subject to a terminal disclaimer.

(21) Appl. No.: 17/145,493

(22) Filed: Jan. 11, 2021

(65) Prior Publication Data

US 2021/0129646 A1     May 6, 2021

Related U.S. Application Data

(63) Continuation of application No. 16/171,850, filed on Oct. 26, 2018, now Pat. No. 10,889,169, which is a
(Continued)

(51) Int. Cl.
*E05B 79/12*     (2014.01)
*B60J 7/19*     (2006.01)
(Continued)

(52) U.S. Cl.
CPC ........... *B60J 7/198* (2013.01); *E05B 47/0001* (2013.01); *E05B 79/12* (2013.01); *E05B 83/18* (2013.01);
(Continued)

(58) Field of Classification Search
CPC ......... Y10T 292/0834; Y10T 292/0841; Y10T 292/0846; Y10T 292/0848;
(Continued)

(56) References Cited

U.S. PATENT DOCUMENTS 2,022,718 A * 12/1935 Heins .......................... B60J 9/02
                                                              292/38
3,584,905 A * 6/1971 Emenaker ............... E05C 9/063
                                                            292/38

(Continued)

OTHER PUBLICATIONS

Solenoid Actuators: Some Hints; Posted on Mar. 24, 2016; https://andreacollo.wordpress.com/2016/03/24/solenoid-actuators-some-hints/.

*Primary Examiner* — Carlos Lugo
(74) *Attorney, Agent, or Firm* — Barnes & Thornburg LLP

(57) ABSTRACT

A latching assembly for use on a pick-up truck, and particularly on a truck bed cover configured to sit over a truck bed section is provided. The latching assembly includes an electronic release assembly and a mechanical override system. An electronic release assembly includes a first rod coupled to a first electronic actuator and a second rod coupled to a second electronic actuator. The electronic release assembly also includes a first electronic actuator that selectively moves the first latch catch and the second electronic actuator that selectively moves the second latch catch. The mechanical override system moves the first and second rods to mechanically cause the first and second electronic actuators, respectively, to manually move the first and second latch catches, respectively, to unlatch the at least the portion of the truck bed cover from the truck bed section.

20 Claims, 18 Drawing Sheets

Related U.S. Application Data continuation of application No. 15/451,844, filed on Mar. 7, 2017, now Pat. No. 10,118,473.

(60) Provisional application No. 62/305,243, filed on Mar. 8, 2016.

(51) Int. Cl.
| | | |
|---|---|---|
| *E05B 47/00* | (2006.01) | |
| *E05B 83/18* | (2014.01) | |
| *E05C 9/04* | (2006.01) | |

(52) U.S. Cl.
CPC .............. *E05C 9/043* (2013.01); *E05C 9/046* (2013.01); *E05C 9/047* (2013.01); *E05B 2047/0084* (2013.01)

(58) Field of Classification Search
CPC ........... Y10T 292/0855; Y10T 292/086; E05B 2047/0084; E05B 79/12; E05B 47/0001
See application file for complete search history.

(56) References Cited

U.S. PATENT DOCUMENTS

| | | | | |
|---|---|---|---|---|
| 5,076,622 | A * | 12/1991 | Detweiler | E05B 79/20 292/DIG. 60 |
| 6,050,623 | A * | 4/2000 | Martus | E05B 83/34 292/171 |
| 6,309,008 | B1 * | 10/2001 | Bacon | B62D 25/12 292/38 |
| 6,427,500 | B1 * | 8/2002 | Weinerman | E05B 79/20 296/100.1 |
| 6,676,174 | B2 * | 1/2004 | Reynolds | E05B 47/026 292/169.14 |
| 7,040,675 | B1 * | 5/2006 | Ott | E05B 47/023 292/DIG. 43 |
| 7,261,328 | B2 * | 8/2007 | Minix | E05B 13/10 292/28 |
| 7,363,786 | B2 * | 4/2008 | TerHaar | E05B 83/16 292/216 |
| 7,375,299 | B1 * | 5/2008 | Pudney | E05B 81/78 200/61.62 |
| 8,029,029 | B2 * | 10/2011 | Terhaar | E05B 81/14 292/216 |
| 8,532,873 | B1 * | 9/2013 | Bambenek | B62D 33/037 340/687 |
| 8,701,353 | B2 * | 4/2014 | Patel | E05B 85/103 292/201 |
| 10,118,473 | B2 * | 11/2018 | McDonald, II | E05B 83/18 |
| 10,889,169 | B2 * | 1/2021 | Mcdonald, II | E05B 83/18 |

\* cited by examiner

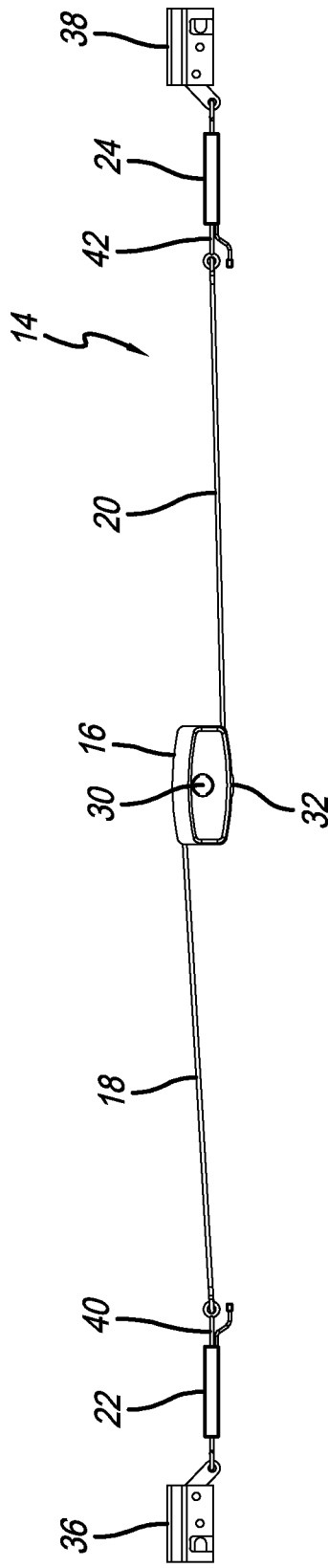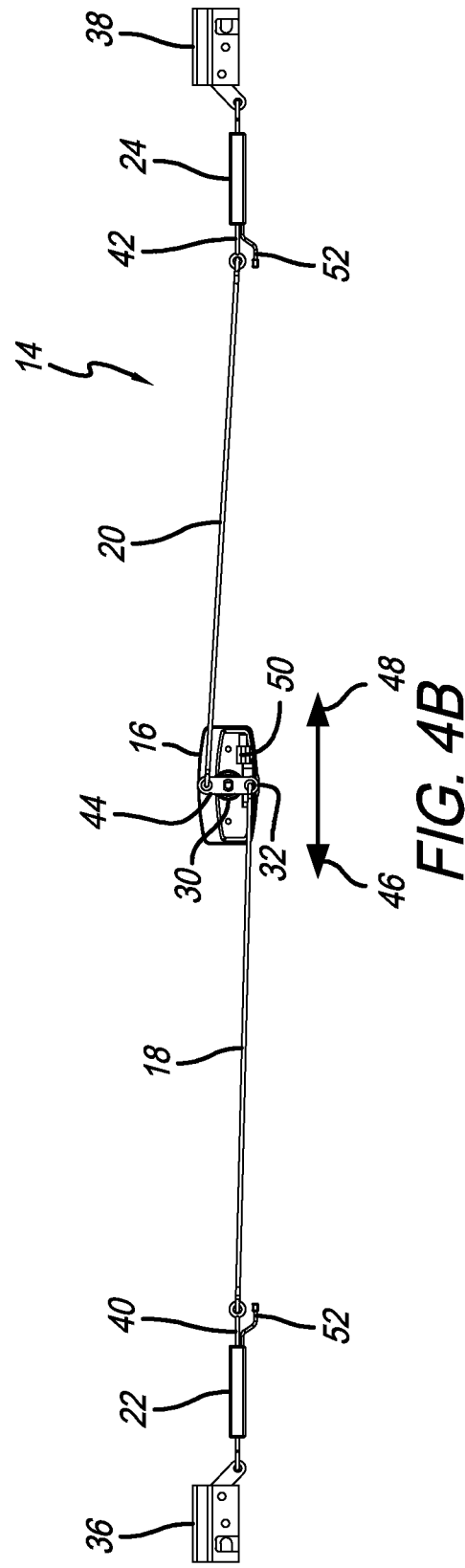
FIG. 4A
FIG. 4B

TOUCH RELEASE HANDLE

RELATED APPLICATIONS

The present Application is a Continuation of application Ser. No. 16/171,850, filed on Oct. 26, 2018, entitled "Touch Release Handle" now U.S. Pat. No. 10,889,169, issuing on Jan. 12, 2021, which claims priority as a Continuation Application to U.S. patent application Ser. No. 15/451,844, filed on Mar. 7, 2017, entitled "Touch Release Handle" now U.S. Pat. No. 10,118,473 which issued on Nov. 6, 2018, which claims priority to U.S. Provisional Patent Application Ser. No. 62/305,243, filed on Mar. 8, 2016, entitled "Touch Release Handle." The subject matter disclosed in those applications are hereby expressly incorporated into the present application by reference.

TECHNICAL FIELD AND SUMMARY

The present disclosure relates to pickup trucks and covers for the beds of same, and particularly an automatic latch release system for the covers.

Pickup trucks and the like typically include a passenger compartment or cab that sits forward of an open cargo bed area. While the truck bed is useable for hauling material, it is exposed to the environment and is unsecured. To address these issues, bed caps and tonneau covers have been designed to both cover and limit access to the bed by securing it with a latch panel or door.

An illustrative embodiment of the present disclosure provides either a truck cap or a tonneau cover that includes a latch system to secure the movable panel or door to the truck. In an embodiment, the cap or cover includes a handle accessible from the exterior of same and is configured to have a switch illustratively in a form of a switch touch button or sensor mechanism that activates at least one actuator coupled to the latch assembly that secures the panel or door to the truck. In an embodiment, the latch system is connected to a power source, such as a battery, that supplies a current to at least one actuator that moves the latch to an unlatched position when activated by the button or switch. The at least one actuator may be a plurality of actuators wherein two actuators are used opposite each other on the panel or door to activate opposing latches that then unlatch the door or panel on the truck. In another embodiment, the opposed actuators are located on opposite sides of the panel or door from the handle and switch, button or sensor, to actuate the latch at locations on the door or panel used to secure them to the truck. In another embodiment, the handle on the door or panel includes a mechanical latching system to operate as a mechanical override for the electronic latching system. In that embodiment, the mechanical latching system is integrated into the automatic latching system wherein the mechanical system engages a mechanical override on the electrical actuator to engage the latch. In an embodiment, the latch may be a rotary latch. In that embodiment, the mechanical latch assembly may include rods extending from the handle that pull on the latch mechanism to release the same. In an embodiment, the mechanical actuator assembly includes a key system to lock or otherwise limit access to the unlatching function of the assembly.

Another illustrative embodiment of the present disclosure provides pick-up truck that includes a cab section located in front of a truck bed section. The pick-up truck comprises a truck bed cover configured to sit over the truck bed section. The truck bed cover is selected from the group consisting of a tonneau cover and a truck cap. A touch release handle assembly is provided which comprises: a handle assembly located on an exterior side of the truck bed cover; first and second rods extending from the handle assembly in opposite directions; first and second electronic actuators; wherein the first rod is coupled to the first electronic actuator; wherein the second rod is coupled to a second electronic actuator; first and second latch catches; wherein the first electronic actuator is configured to selectively move the first latch catch; wherein the second electronic actuator is configured to selectively move the second latch catch; wherein the first and second rods, the first and second electronic actuators, and the first and second latch catches are located interior of the truck bed section opposite the exterior side of the truck bed cover; a key cylinder assembly configured to manually lock and unlock the touch release handle assembly; and a switch configured to send a signal to the first and second electronic actuators to cause the first and second latch catches to disengage from the truck bed section. The first and second rods and the first and second electronic actuators also serve as part of a mechanical override system that selectively unlatches at least a portion of the truck bed cover from the truck bed section. The mechanical override system comprises: a link that is operatively coupled to the handle assembly and configured to rotate relative thereto; wherein the first and second rods are each located on opposite sides of a pivot point on the link so that as the link rotates, the first and second rods move in opposite directions; and wherein rotation of the link in a first direction moves the first and second rods to mechanically cause the first and second electronic actuators, respectively, to manually move the first and second latch catches, respectively, to unlatch the at least the portion of the truck bed cover from the truck bed section.

In the above and other illustrative embodiments, the pick-up truck may further comprise: the handle assembly also including a controller that is electrically coupled to the switch and electrically coupled to the first and second electronic actuators; and wherein the controller being configured such that when the switch is activated, the controller sends a signal to both the first and second electronic actuators to move the first and second latch catches, respectively, to unlatch the at least the portion of the truck bed cover from the truck bed section; the controller cannot send the signal to the first and second electronic actuators when the controller is in a locked condition; each of the first and second electronic actuators including a pull rod, wherein a first side of the pull rod of the first electronic actuator is coupled to one latch arm of the first latch catch, and a first side of the pull rod of the second electronic actuator is coupled to one latch arm of the second latch catch, and wherein a second side of the pull rod of the first electronic actuator is coupled to the first rod and a second side of the pull rod of the second electronic actuator is coupled to the second rod; the pull rods of the first and second electronic actuators are each configured to be electronically moved which moves the first and second latch catches, respectively, to the unlatched condition; the first and second rods being configured to mechanically move the pull rods of the first and second electronic actuators, respectively, to mechanically move the first and second latch catches, respectively, to the unlatched condition; the pull rod of each of the first and second electronic actuators being moved via an electrical motive force selected from the group consisting of a linear actuator, rotary actuator, and a solenoid; a movable latch on each of the first and second latch catches configured to selectively engage and disengage from corresponding first and second catch members located on the truck bed section of the pick-up truck; rotation of the key cylinder allowing the link to be rotated which moves the first and second rods; the pull rods of the first and second electronic actuators being configured to move the first and second latch catches, respectively, independent of manual actuation of the first and second rods; the key cylinder being coupled to a spindle that rotates the link to move the first and second rods; the controller may be activated by a key fob; the controller being electrically connected to the pick-up truck locking system, such that when the pick-up truck is in its locked state, the controller cannot be activated to unlatch; and the truck bed cover being a truck cap, the handle assembly being positioned on an exterior side of a door, and wherein the first and second rods, the first and second actuators, and the first and second latch catches are located on an interior side of the door opposite the exterior side.

Another illustrative embodiment of the present disclosure provides a pick-up truck that includes a cab section located in front of a truck bed section. The pick-up truck comprises a truck bed cover configured to sit over the truck bed section. The truck bed cover is selected from the group consisting of a tonneau cover and a truck cap. A touch release assembly comprises: first and second rods extending in opposite directions from each other adjacent at least a portion of the truck bed cover; first and second electronic actuators; wherein the first rod is coupled to the first electronic actuator; wherein the second rod is coupled to a second electronic actuator; first and second latch catches; wherein the first electronic actuator is configured to selectively move the first latch catch; wherein the second electronic actuator is configured to selectively move the second latch catch; and a switch configured to be engaged to send a signal to the first and second electronic actuators to cause the first and second latch catches to disengage from the truck bed section, The first and second rods and the first and second electronic actuators also serve as part of a mechanical override system that selectively unlatches at least a portion of the truck bed cover from the truck bed section. The mechanical override system comprises: a link operatively coupled to the truck bed cover and configured to move relative thereto; the first and second rods move when the link moves; and movement of the link moves the first and second rods to mechanically cause the first and second electronic actuators, respectively, to manually move the first and second latch catches, respectively, to unlatch the at least the portion of the truck bed cover from the truck bed section as an alternative to moving the first and second latch catches by electrically moving the first and second electronic actuators.

In the above and other illustrative embodiments, the pick-up truck may further comprise: the first and second rods, the first and second electronic actuators, and the first and second latch catches are located interior of the truck bed section opposite exterior of the truck bed cover; and movement of the link in a first direction moves the first and second rods to mechanically cause the first and second electronic actuators, respectively, to manually move the first and second latch catches, respectively, to unlatch the at least the portion of the truck bed cover from the truck bed section.

Another illustrative embodiment of the present disclosure provides a pick-up truck that includes a cab section located in front of a truck bed section. The pick-up truck comprises a truck bed cover configured to sit over the truck bed section. The truck bed cover is selected from the group consisting of a tonneau cover and a truck cap. A touch release assembly comprises: at least one rod located adjacent at least a portion of the truck bed cover; at least one electronic actuator; the at least one rod is coupled to the at least one electronic actuator; a latch; the at least one electronic actuator is configured to selectively move the latch; and a switch, that when engaged sends a signal to the at least one electronic actuator that causes the latch to unlatch from the truck bed section. The at least one rod and the at least one electronic actuator also serve as part of a mechanical override system that selectively unlatches at least a portion of the truck bed cover from the truck bed section. The mechanical override system comprises: a link operatively coupled to the truck bed cover and configured to move relative thereto; and the at least one rod moves when the link is moved to mechanically cause the at least one electronic actuator to manually move the latch to unlatch the at least the portion of the truck bed cover from the truck bed section as an alternative to moving the latch by electrically moving the at least one electronic actuator.

Another illustrative embodiment of the present disclosure provides a latching assembly for use on a pick-up truck that includes a cab section located in front of a truck bed section, and particularly on a truck bed cover configured to sit over the truck bed section. The truck bed cover is selected from the group consisting of a tonneau cover and a truck cap. The latching assembly comprises: an electronic release assembly which comprises: first and second rods extending in opposite directions from each other; first and second electronic actuators; the first rod is coupled to the first electronic actuator; the second rod is coupled to a second electronic actuator; first and second latch catches; the first electronic actuator is configured to selectively move the first latch catch; the second electronic actuator is configured to selectively move the second latch catch; and a switch configured to be engaged to send a signal to the first and second electronic actuators to cause the first and second latch catches to disengage from the truck bed section. The first and second rods and the first and second electronic actuators also serve as part of a mechanical override system that selectively unlatches at least a portion of the truck bed cover from the truck bed section. The mechanical override system comprises: a link operatively coupled to the truck bed cover and configured to move relative thereto; the first and second rods move when the link moves; and wherein movement of the link moves the first and second rods to mechanically cause the first and second electronic actuators, respectively, to manually move the first and second latch catches, respectively, to unlatch the at least the portion of the truck bed cover from the truck bed section as an alternative to moving the first and second latch catches by electrically moving the first and second electronic actuators.

In the above and other illustrative embodiments, the latching assembly may further comprise: the electronic release assembly also including a controller being electrically coupled to the switch and electrically coupled to the first and second electronic actuators; and wherein the controller is configured such that when the switch is activated, the controller sends a signal to both the first and second electronic actuators to move the first and second latch catches, respectively; each of the first and second electronic actuators including a pull rod, wherein a first side of the pull rod of the first electronic actuator being coupled to one latch arm of the first latch catch, and a first side of the pull rod of the second electronic actuator being coupled to one latch arm of the second latch catch, and wherein a second side of the pull rod of the first electronic actuator being coupled to the first rod and a second side of the pull rod of the second electronic actuator being coupled to the second rod; the pull rods of the first and second electronic actuators are each configured to be electronically moved which moves the first and second latch catches, respectively, to the unlatched condition; the first and second rods being configured to mechanically move the pull rods of the first and second electronic actuators, respectively, to mechanically move the first and second latch catches, respectively, to the unlatched condition; the pull rod of each of the first and second electronic actuators being moved via an electrical motive force selected from the group consisting of a linear actuator, rotary actuator, and a solenoid; a movable latch on each of the first and second latch catches configured to selectively engage and disengage from corresponding first and second catch members located on the truck bed section of the pick-up truck; and the pull rods of the first and second electronic actuators being configured to move the first and second latch catches, respectively, independent of manual actuation of the first and second rods.

Additional features of the present disclosure will become apparent to those skilled in the art upon consideration of illustrative embodiments including the best mode of carrying out the disclosure as presently perceived.

BRIEF DESCRIPTION OF THE DRAWINGS

The present disclosure will be described hereafter with reference to the attached drawings which are given as non-limiting examples only, in which:

FIGS. 4A and 4B are front and rear isolated views of a latch assembly;

Corresponding reference characters indicate corresponding parts throughout the several views. The exemplification set out herein illustrates embodiments of the latch assembly, and such exemplification is not to be construed as limiting the scope of the latch assembly in any manner.

DETAILED DESCRIPTION

Figure 1:
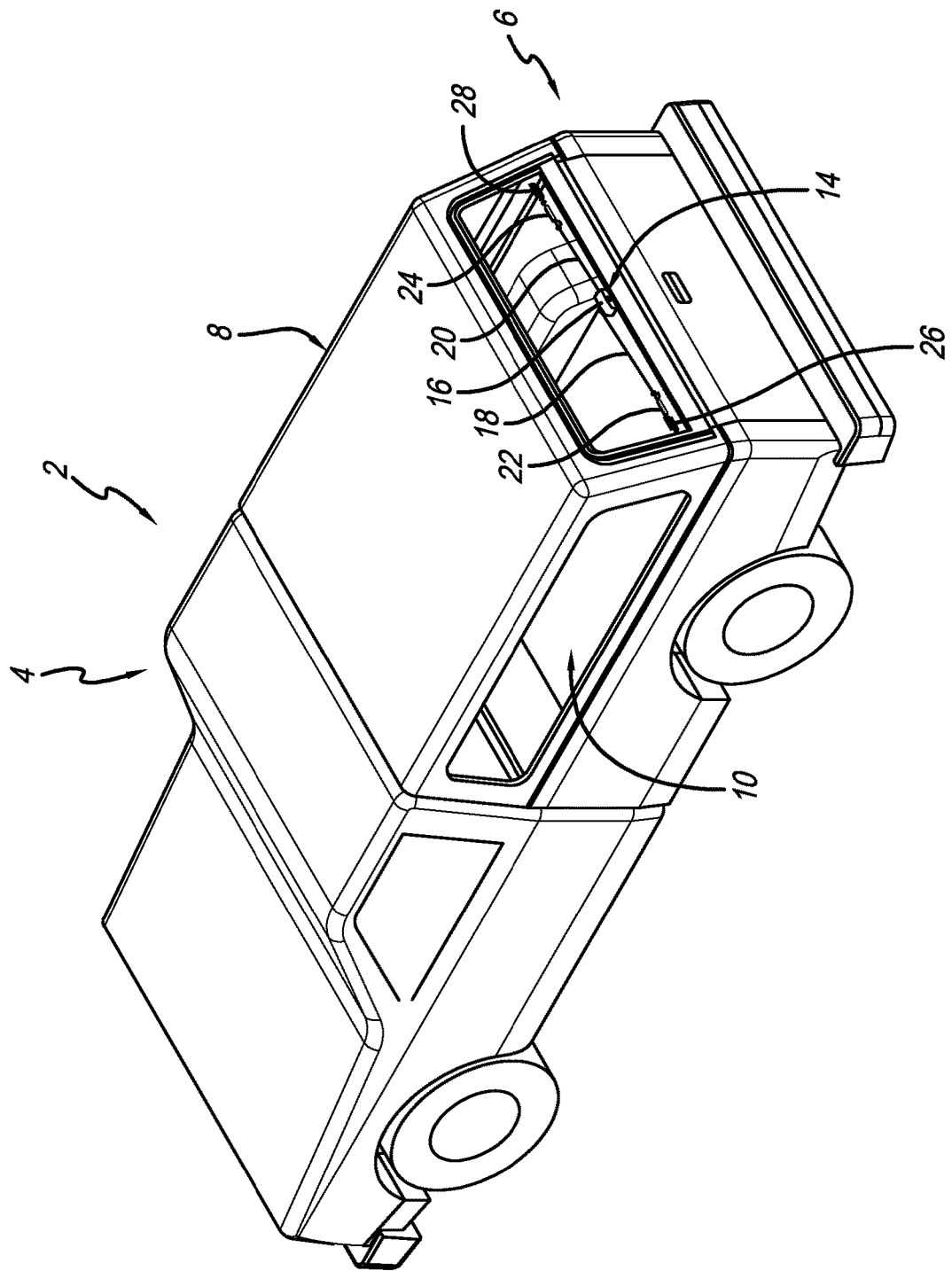
FIG. 1 is a rear perspective view of an illustrative embodiment of a pickup truck.

A rear perspective view of an illustrative truck 2, such as a pickup truck, for example, is shown in FIG. 1. Truck 2 includes forward passenger compartment or cab 4 and rearward bed area 6. Sitting on top of bed 6 is a cap 8 which forms compartment 10 in conjunction with the interior of bed 6. In an illustrative embodiment, cap 8 includes a rear lift door 12 that swings open and closed to selectively limit access into compartment 10 of bed 6. It is appreciated that although a rear lift door is shown, such a door may be included on any side of cap 8. As shown in this illustrative view, lift door 12 includes a latch assembly 14 and illustratively includes handle portion 16, and opposed rods 18 and 20 extending to electrical/mechanical actuators 22 and 24 which attach to latches 26 and 28, respectively. These latches are configured to engage a lock or otherwise securing structure on the cap, tailgate, sidewalls, etc.

Figure 2:
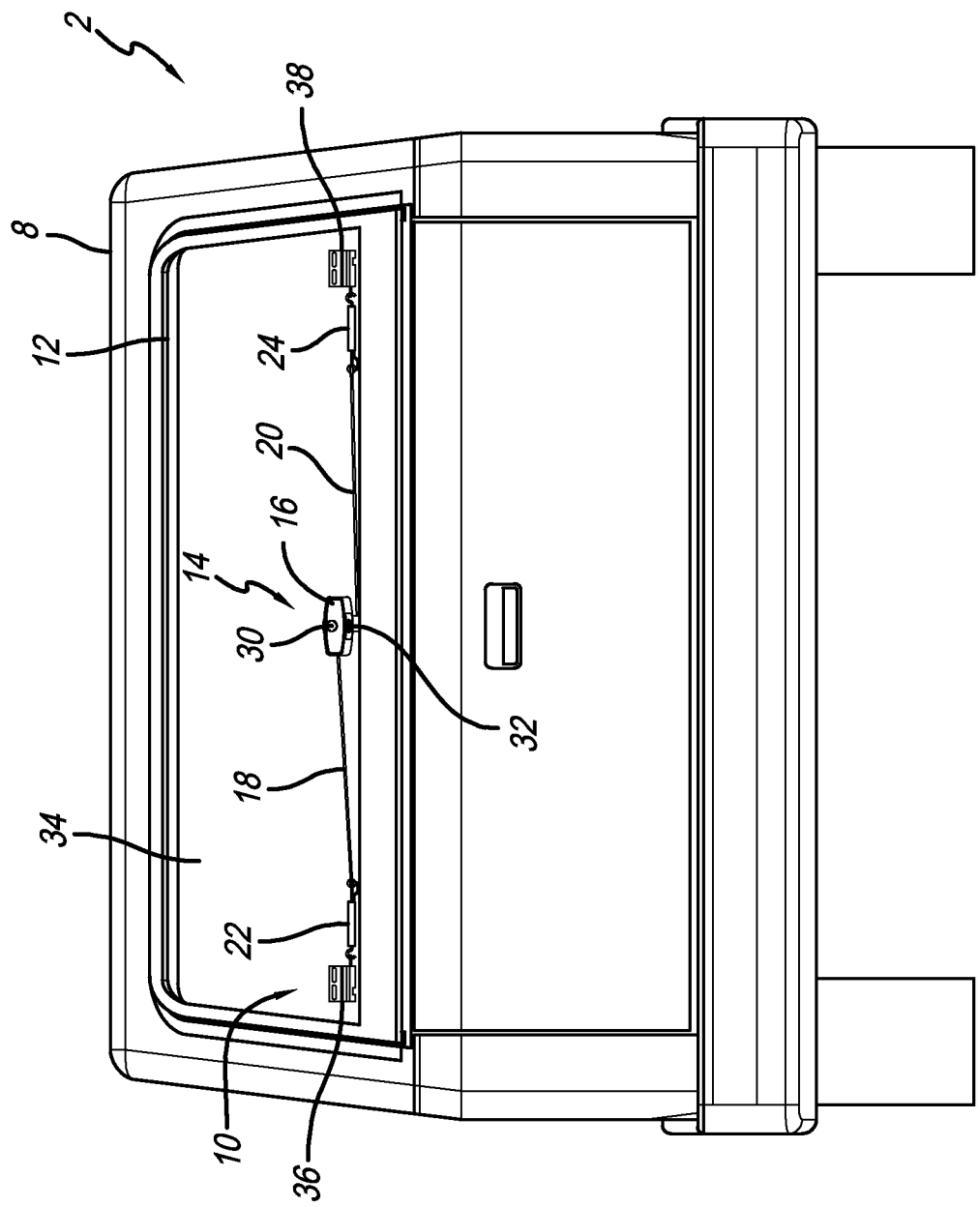
FIG. 2 is a rear view of the pickup truck with a cap secured thereon.

A rear view of truck 2 and cap 8 is shown in FIG. 2. This view also shows latch assembly 14 located on lift door 12, and handle portion 16 with a key cylinder 30 and button or switch 32. It is appreciated in this embodiment that lift door 12 includes a window panel 34. A portion of handle 16 is located on the exterior side of window panel 34 and another portion located on the interior side. The actuation portion of assembly 14 is located within compartment 10 so it cannot be accessed from the exterior of the vehicle. As shown, rods 18 and 20 are located behind window panel 34 along with electronic actuators 22 and 24 and rotary latch catches 36 and 38. In contrast, the activation portion is located exterior of lift door 12 to allow activation of same by an operator. As shown, key cylinder 30 and button 32 are located in front of window panel 34.

Figure 3:
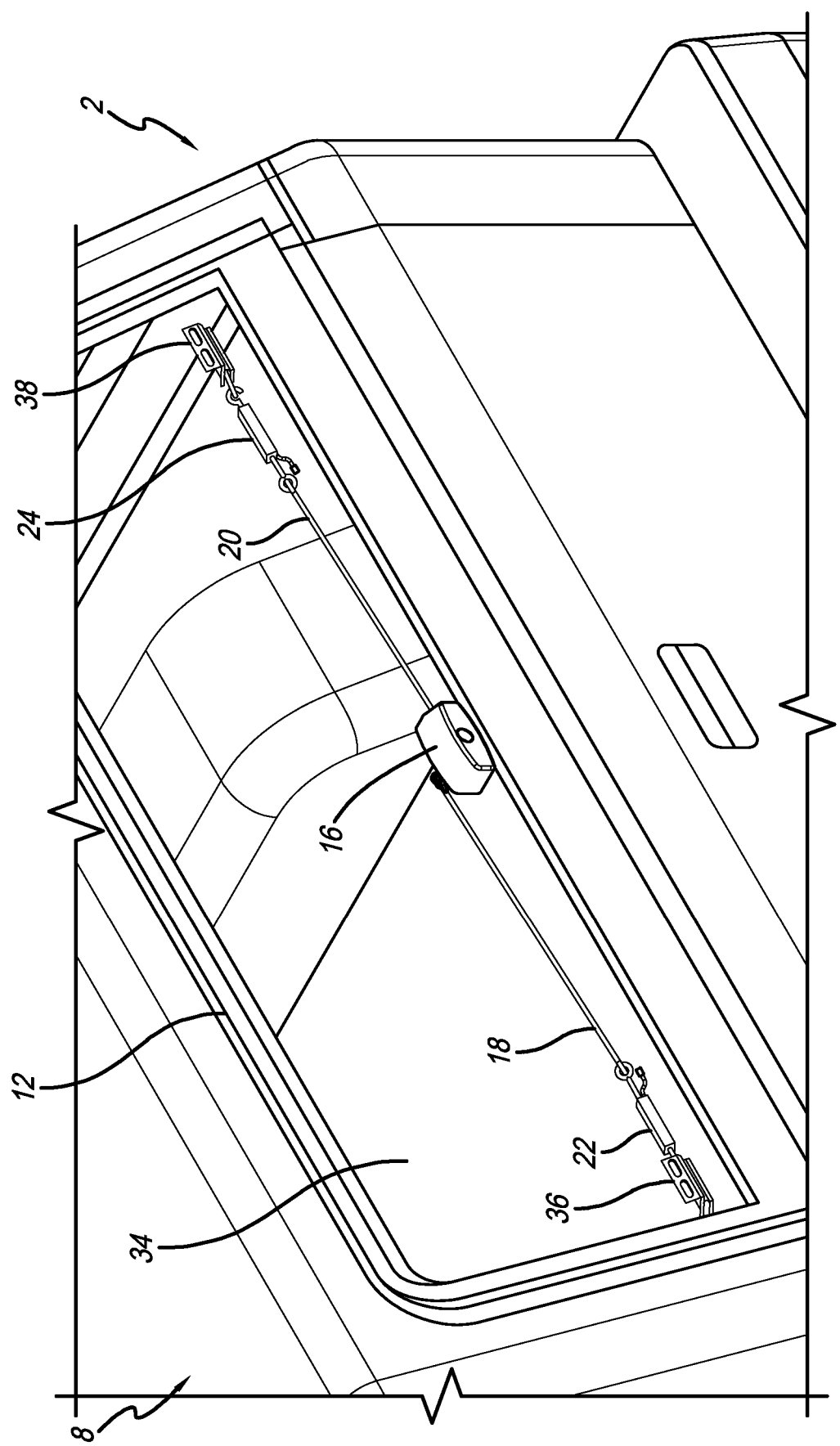
FIG. 3 is a rear detail perspective view of the cap located on the truck.

A rear detail perspective view of cap 8 located on truck 2 is shown in FIG. 3. This view further shows handle 16 located exterior of window panel 34, while rods 18 and 20, electronic actuators 22 and 24, and rotary latch catches 36 and 38 are located behind window panel 34. It is appreciated from this view that the actual latches are positioned remote from handle 16. This is because of the particular configuration of lift door 12. It is contemplated, however, that the latch assembly may be positioned in other various locations on differently sized and/or configured doors to achieve the same result and are contemplated to be within the scope of this disclosure.

Front and rear isolated views of latch assembly 14 are shown in FIGS. 4A and 4B. Shown in FIG. 4A is a front facing view wherein handle 16 includes key cylinder 30 configured to face the operator to engage, move, or activate the latch assembly. Button 32 is also accessible to the operator to electronically disengage the latches as well. Rods 18 and 20 are shown extending from handle 16 and each being attached to a mechanical override 40 and 42 of electrical actuators 22 and 24, respectively. Similarly, rotary latch catches 36 and 38 are also coupled to electronic actuators 22 and 24, respectively. Additional embodiments may include slam latches to secure lift door 12.

A rear view of latch assembly 14 is shown in FIG. 4B. This view shows link 44 located behind handle 16 and connecting to rods 18 and 20. Link 44 is configured to rotate about the same axis as key cylinder 30 so that a proper key may rotate cylinder 30 and thus rotate link 44 which pulls on rod 18 in direction 48 and rod 20 in direction 46 pulling mechanical overrides 40 and 42 of electronic actuators 22 and 24, respectively. Also shown in this view is actuator controller 50 that includes button 32 wired to electrical connectors 52 and 54 on electronic actuators 22 and 24, respectively. In this view the wires are not shown. Controller 50 is configured so when button 32 is depressed, it sends a signal to both actuators 22 and 24 to pull rotary latch catches 36 and 38 illustratively in directions 48 and 46, respectively, to create an unlatched condition the same as the mechanical system did through rods 18 and 20. When the controller is in the locked condition, it cannot be used and the doors will not open. When the operator engages the lock button, the circuit for the controller is electrically disconnected and will not operate. Conversely, when the vehicle is unlocked, the controller circuit is electrically powered and will operate to unlatch the door.

Figure 5:
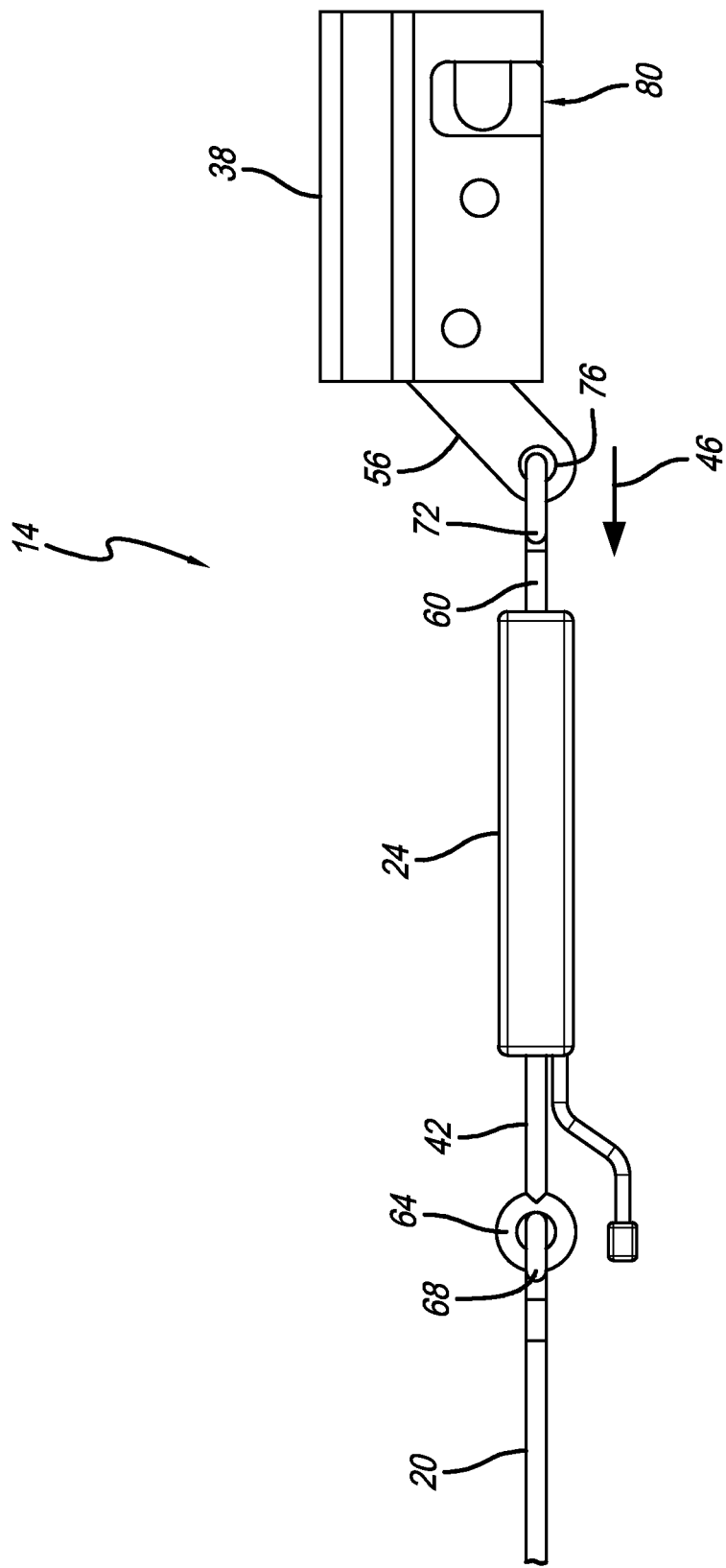
FIG. 5 is a detail view of a portion of the latch assembly.

A detailed view of a portion of latch assembly 14 is shown in FIG. 5. In particular, electronic actuator 24 is shown attached to a rotary latch arm 56 on rotary latch catch 38 via illustrative pull rod 60 which is also part of mechanical override 42 with electronic actuator 24 located therebetween. In an illustrative embodiment, pull rod 60 is part of override 42 so that if actuator 24 does not pull latch arm 56, rod 20 may do the same under mechanical means. Also shown in this view is eyelet 64 on override 42 which connects to hook 68 of rod 20 for making a mechanical connection between the latch and the rod. Similarly, hook 72 on pull rod 60 is shown disposed through opening 76. It is appreciated that electronic actuator 24 may be a linear or rotary actuator, or a solenoid. Actuator 24 is configured to move pull rod 60 in direction 46 which pulls on rotary latch arm 56 to move rotary latch catch 80 that disengages from a corresponding catch on the cap cover or side of truck to unlatch same.

Figure 18:
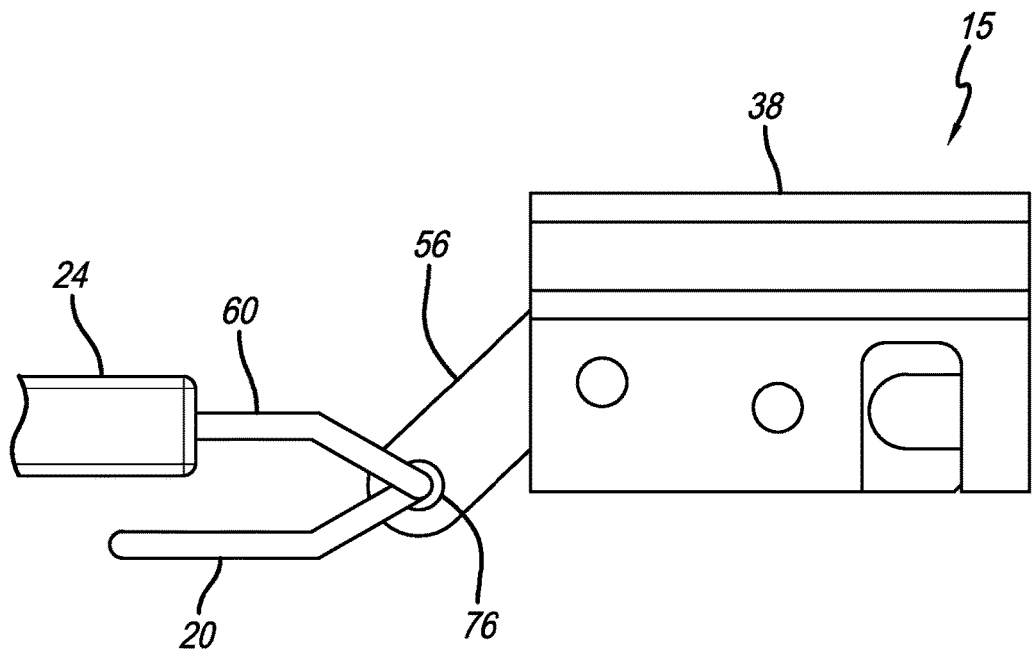
FIG. 18 is an illustrative embodiment of an alternate latch assembly.
Figure 19:
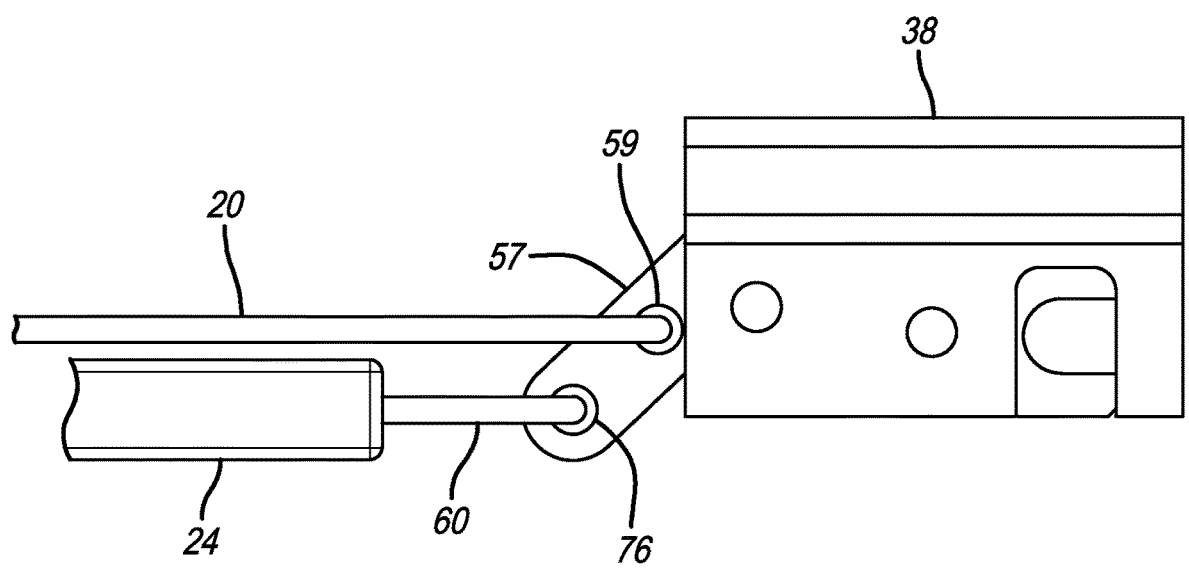
FIG. 19 is another alternate embodiment of a latch assembly.

Alternative embodiments of latch assemblies 15 and 17 are shown in FIGS. 18 and 19, respectively. These embodiments, in contrast to latch assembly 14 shown in FIG. 5, include a separately attached electric actuator 24 from rod 20. In the case of latch assembly 15, rod 28 illustratively attaches to pull latch arm 56 at opening 76 on rotary latch catch 38. As shown, electronic actuator 24 and pull rod 60 move rotary latch catch 38 independent of manual actuation of rod 20. The similar view shown in FIG. 19 includes a latch catch 38 that is coupled to a pull latch arm 57 having a second opening 59 in addition to opening 76. In this embodiment, rod 20 attaches to pull latch arm 57 at opening 59. In contrast, electronic actuator 24 pulls on pull rod 60 that independently attaches to pull latch arm 57 via opening 76.

Figure 6:
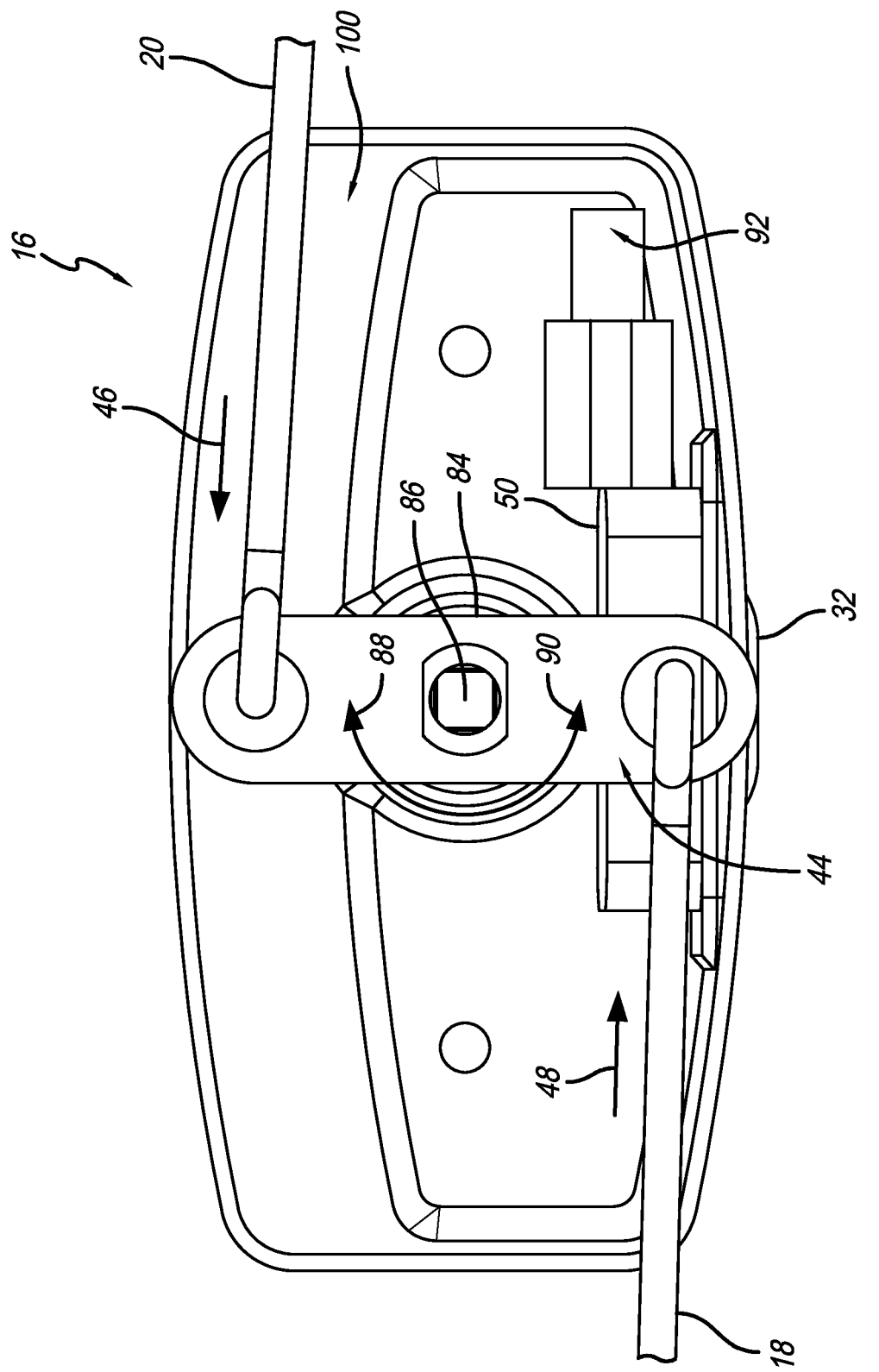
FIG. 6 is an interior end view of the handle assembly.

An interior end view of handle 16 is shown in FIG. 6. This view demonstrates the arrangement of the operating structures in handle 16. For example, similar to the view in FIG. 4, link 44 is configured to pivot about lock cylinder 84 at spindle 86 in directions 88 and 90. It is appreciated that by turning the key cylinder using a key, link 44 is rotated which pulls rods 18 and 20 in directions 48 and 46, respectively. This, as previously discussed, pulls mechanical overrides 40 and 42, respectively, to actuate rotating latch catches 36 and 38, respectively, to unlatch the door. Also shown is actuator controller 50 located in cavity 100 in handle 16. Controller 50 includes a button 32 located thereon, as well as electrical connection 92 which connects to connectors 52 and 54 of electronic actuators 22 and 24, respectively (see, also, FIG. 4B). When button 32 is pressed, a signal is sent from the controller through connector 92 and lines or wires (not shown) to connectors 52 and 54 which activate actuators 22 and 24 to operate latches 36 and 38, respectively (see, also, FIG. 4B). This has the effect of automatically releasing the latches instead of manually releasing them.

Figure 7:
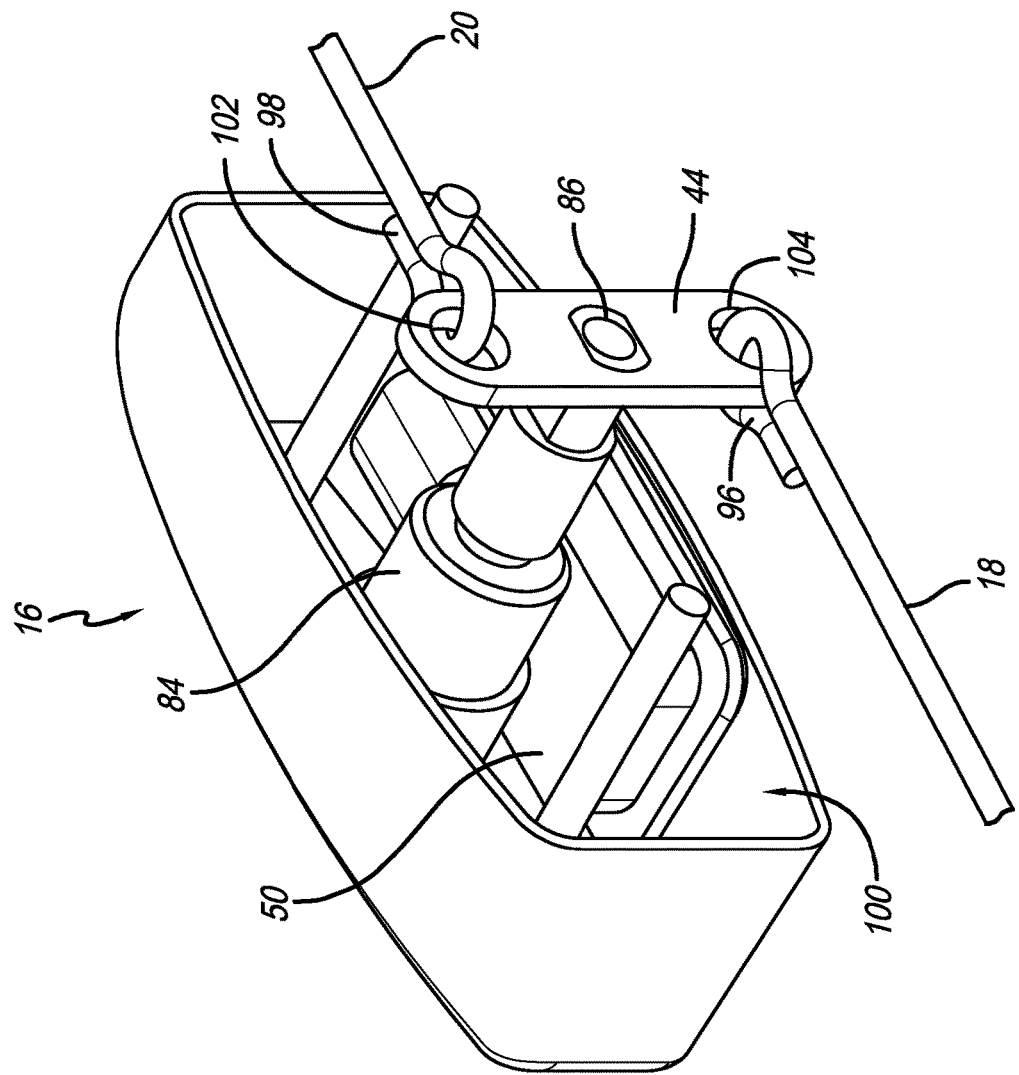
FIG. 7 is a rear perspective view of the handle assembly.

A rear perspective view of handle 16 is shown in FIG. 7. This view further highlights the descriptions from FIG. 6 where link 44 is attached to key cylinder 84 via spindle 86. So when cylinder 84 moves, it rotates spindle 86 which rotates link 44 which moves rods 18 and 20, as previously discussed. This view also shows how hooks 96 and 98 engage holes 102 and 104 disposed in link 44 to attach rods 18 and 20 thereto. Also shown in this view is controller 50 attached to handle 16 in cavity 100. Illustratively, button 32 may extend through handle 16 to be activated by the operator. In alternative embodiments, one latch may be attached to link 44, or one actuator mechanically attached to both latches.

Figure 8:
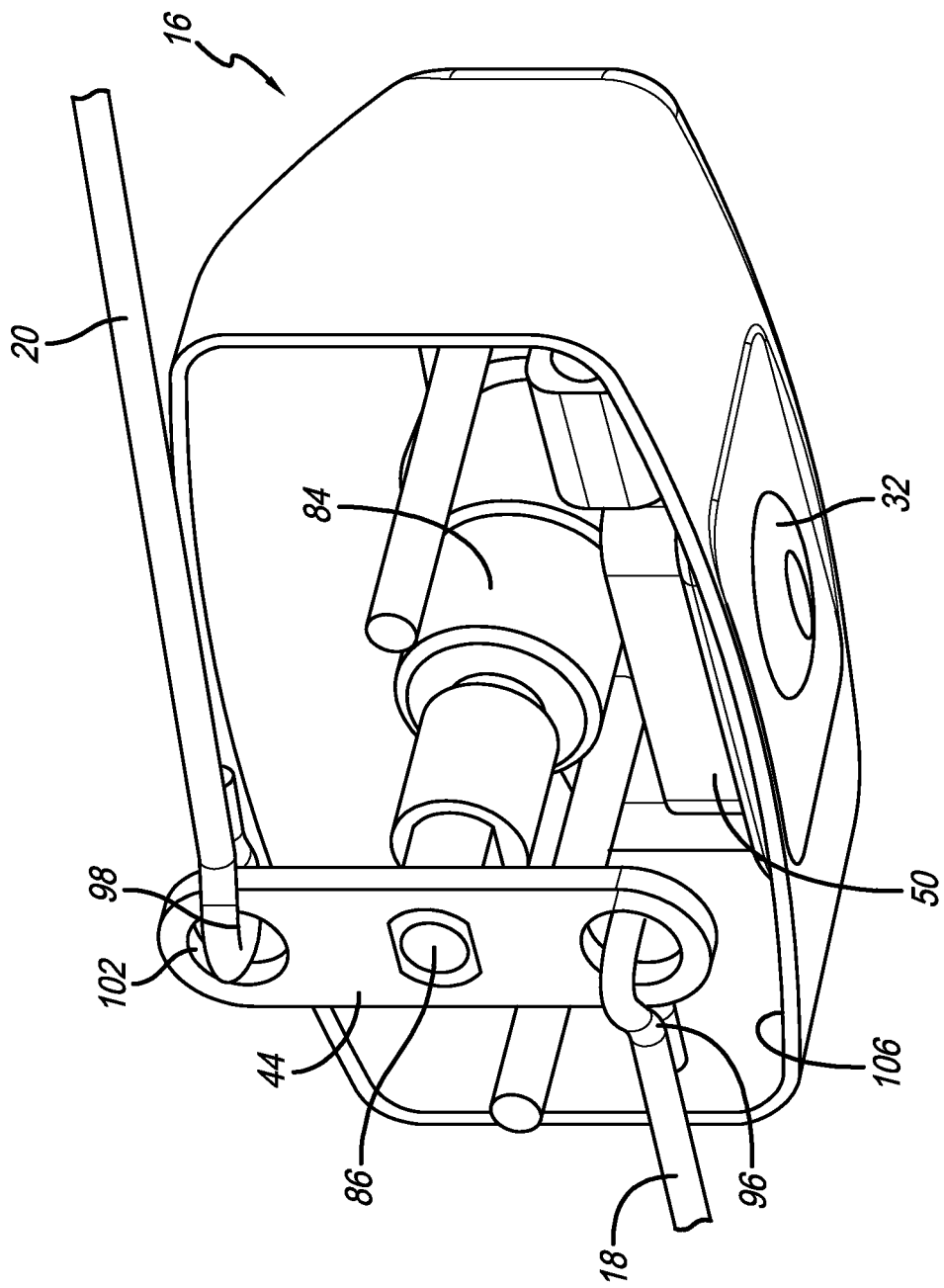
FIG. 8 is another rear perspective view of the handle assembly.

Another rear perspective view of handle 16 is shown in FIG. 8. This view further depicts how controller 50 is attached to lower surface 106 of handle 16. Button 32 extends through handle 16 to the exterior to be accessed by the operator. It is appreciated, however, that the controller does not have to be located in the exact position as shown. The controller may be located remotely from button 32 and be electrically connected to the button and actuators through wire(s) or wirelessly. The controller may be part of an OEM system or an after-market product. In these embodiments the controller may receive a lock/unlock signal from the vehicle's FOB or door lock switch to lock/unlock the latches and/or operate the latch actuators.

Figure 9:
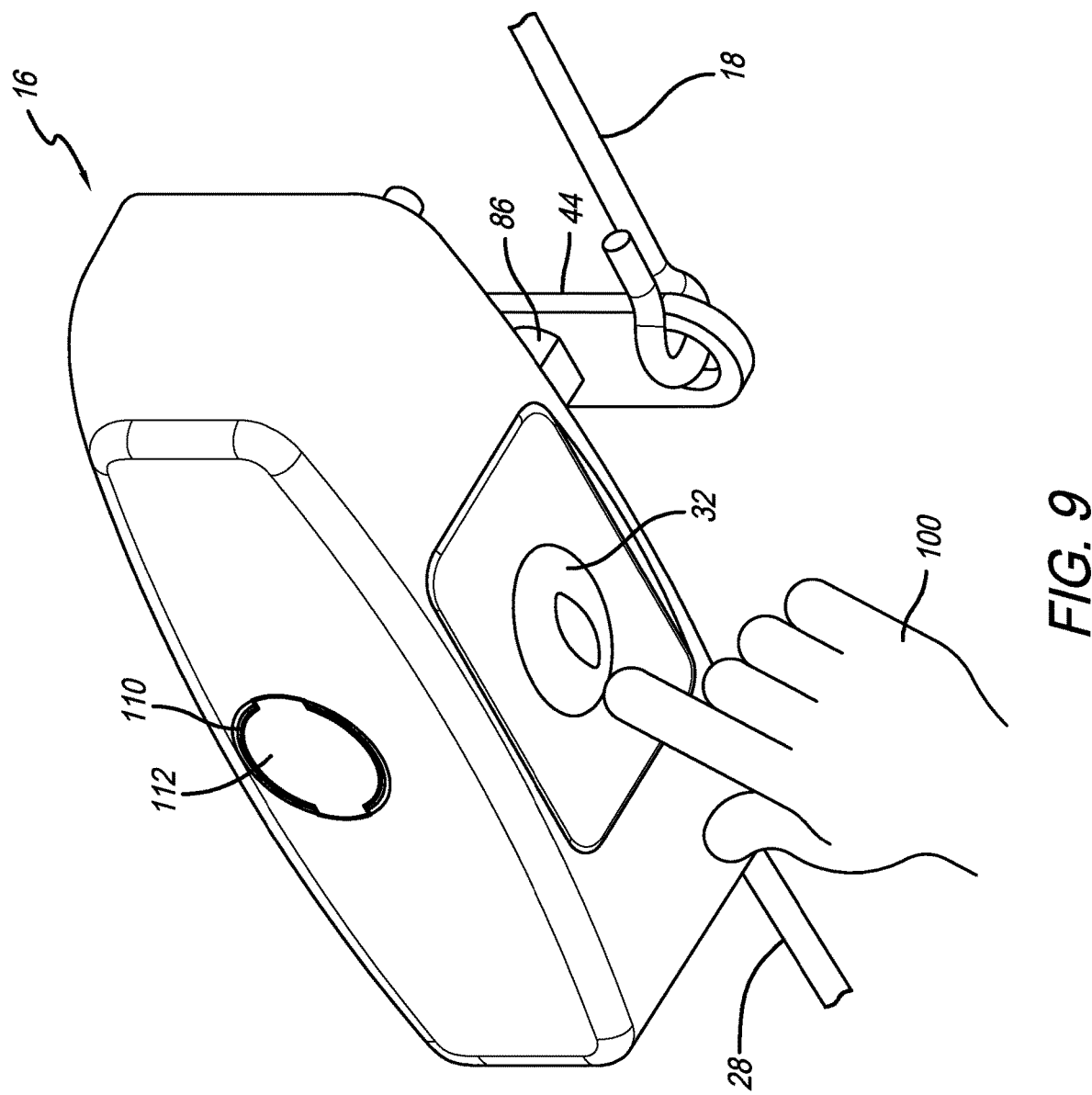
FIG. 9 is an underside front perspective view of the handle assembly.

An underside front perspective view of handle 16 is shown in FIG. 9. This view depicts an operator 108 engaging button 32 to automatically unlatch door 12, as previously described. It is appreciated from this view the ease to which unlatching the door can be accomplished. This is in contrast to inserting a key into key opening 110 (shown herein with key cover 112 shrouding same) and then rotating the cylinder to actuate link 44 through spindle 86. Illustratively, the controller may be connected to the vehicle's locking system, as also previously described, such that when the vehicle is in its locked state, the controller cannot be activated to open the lift door. When the operator activates the locking system through a handheld key fob or lock/unlock button, the system is activated including the controller which may then unlock the lift door. It is appreciated that a manual key cylinder, though not activating the controller, may be used as a bypass to manually unlock the lift door.

Figure 10:
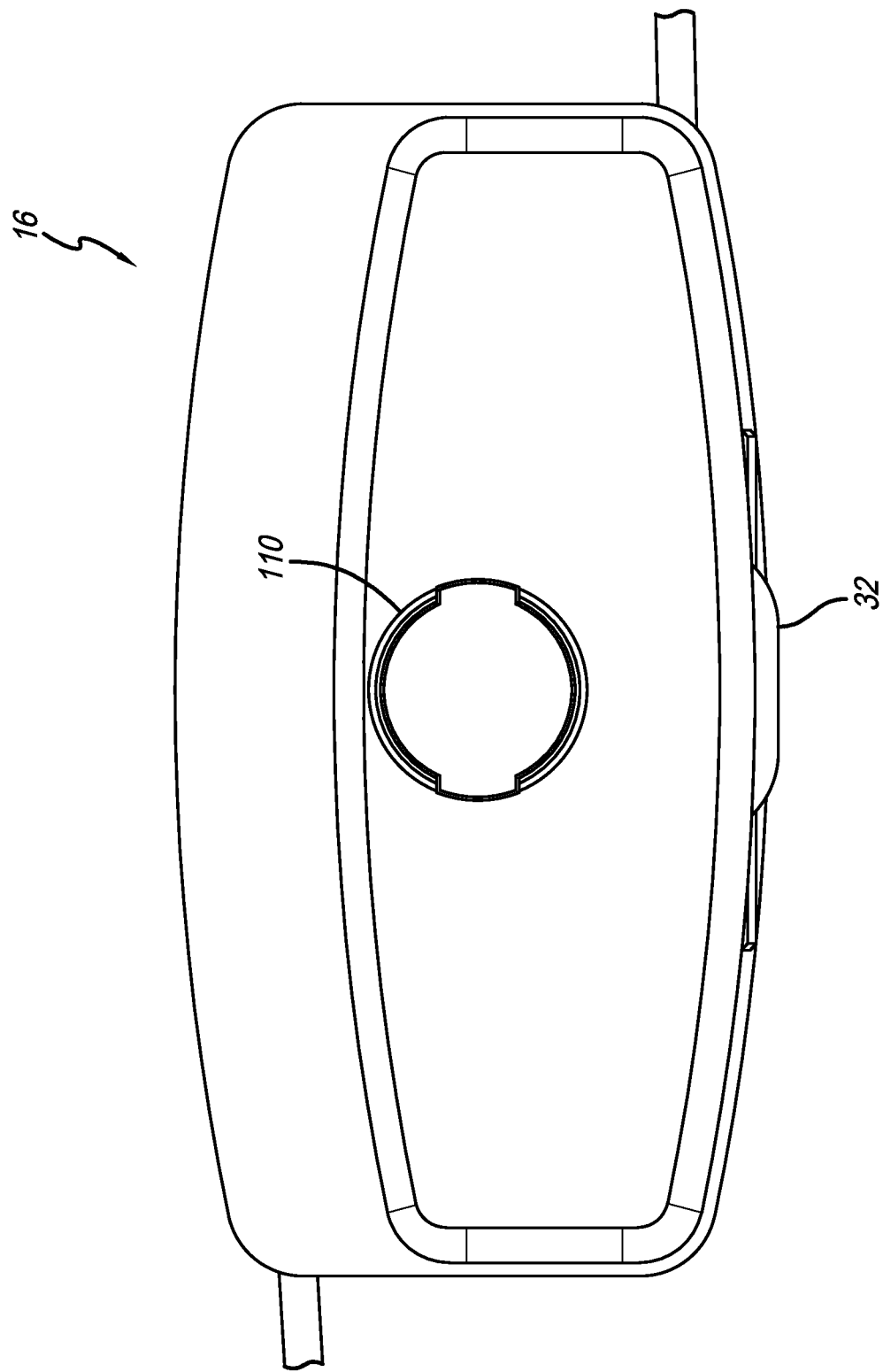
FIG. 10 is a front elevation view of the handle assembly.
Figure 11:
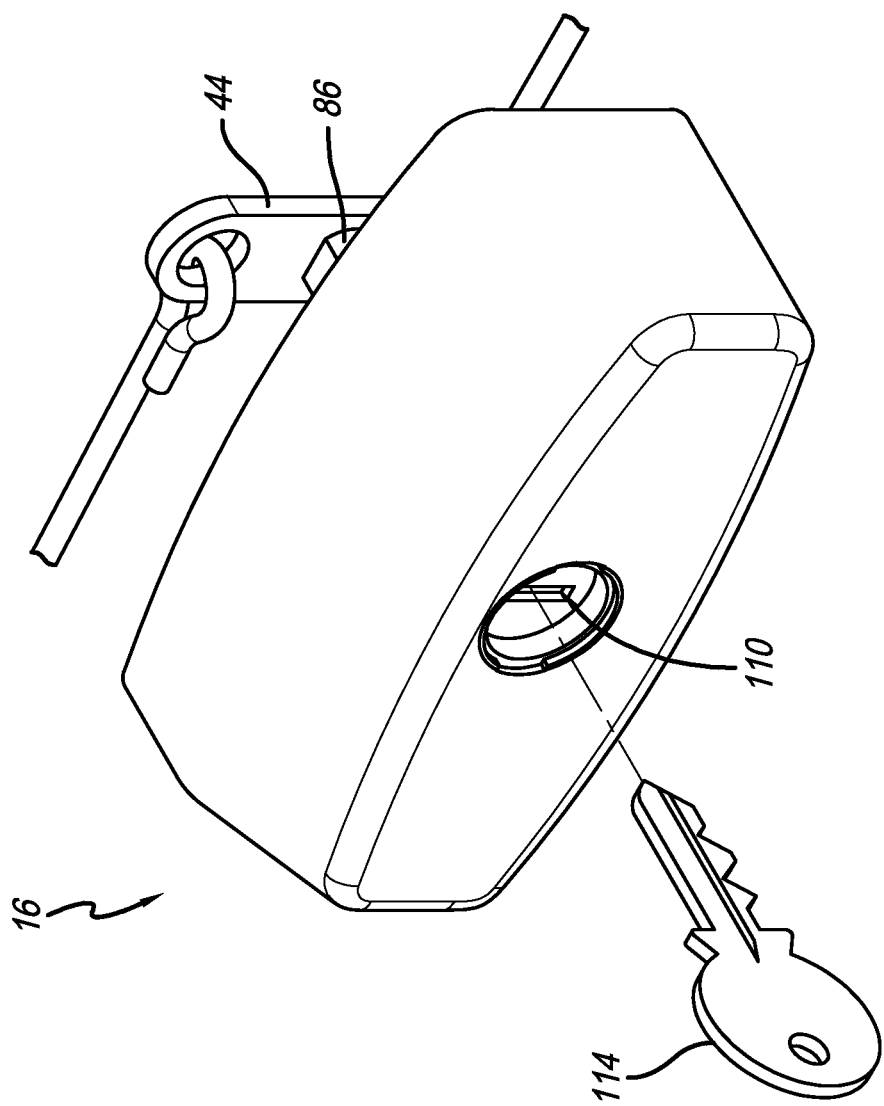
FIG. 11 is a perspective view of the handle assembly.

A front elevation view of handle 16 is shown in FIG. 10. This view shows the relative positioning of button 32 with respect to key opening 110, as well as the rest of the handle structure. It is appreciated that the location of button 32 is illustrative and may be placed in other locations convenient to the operator. In contrast, the perspective view of handle 16 shown in FIG. 11 includes key cylinder 110 with a key 114 configured to be inserted therein for manually actuating link 44 via spindle 86.

Figure 12:
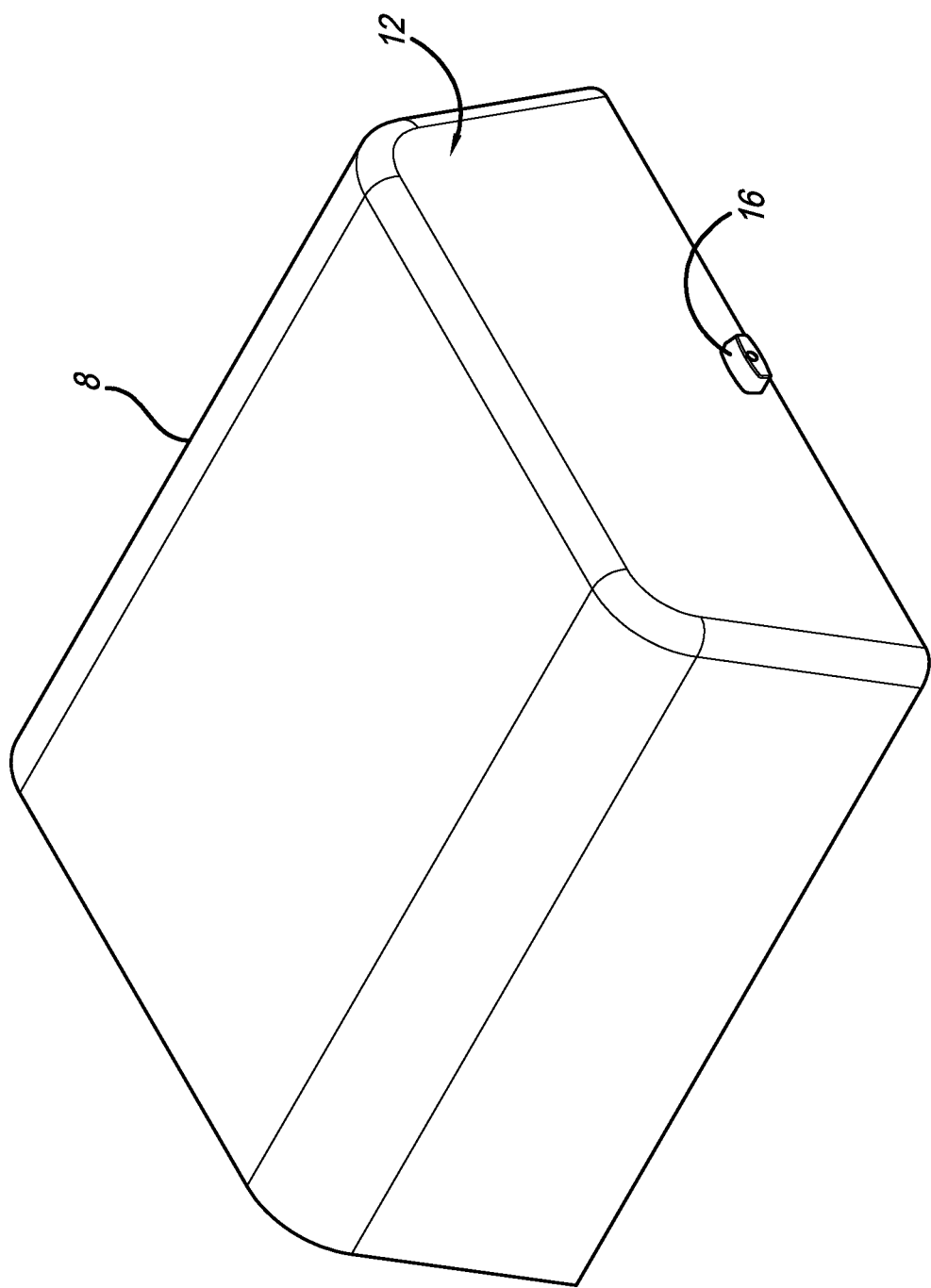
FIG. 12 is a perspective view of the cap with the handle assembly protruding from a lift door.

A perspective view of cap 8 is shown in FIG. 12. Lift door 12 is also shown with handle 16 protruding therefrom. It is appreciated from this view that the operational mechanism, such as the electronic actuators 22 and 24 and rotary latch catches 36 and 38, are located behind door 12. It is further appreciated as a security feature that the controller may disconnect from the electrical circuit when the vehicle is in a locked condition. This denies access not only to the bed (when the lift door is down and locked) but also prevents anyone from operating the controller without using the vehicle's key fob, activating the on/off button interior of the vehicle, or manually unlocking the lift door using a key.

Figure 13:
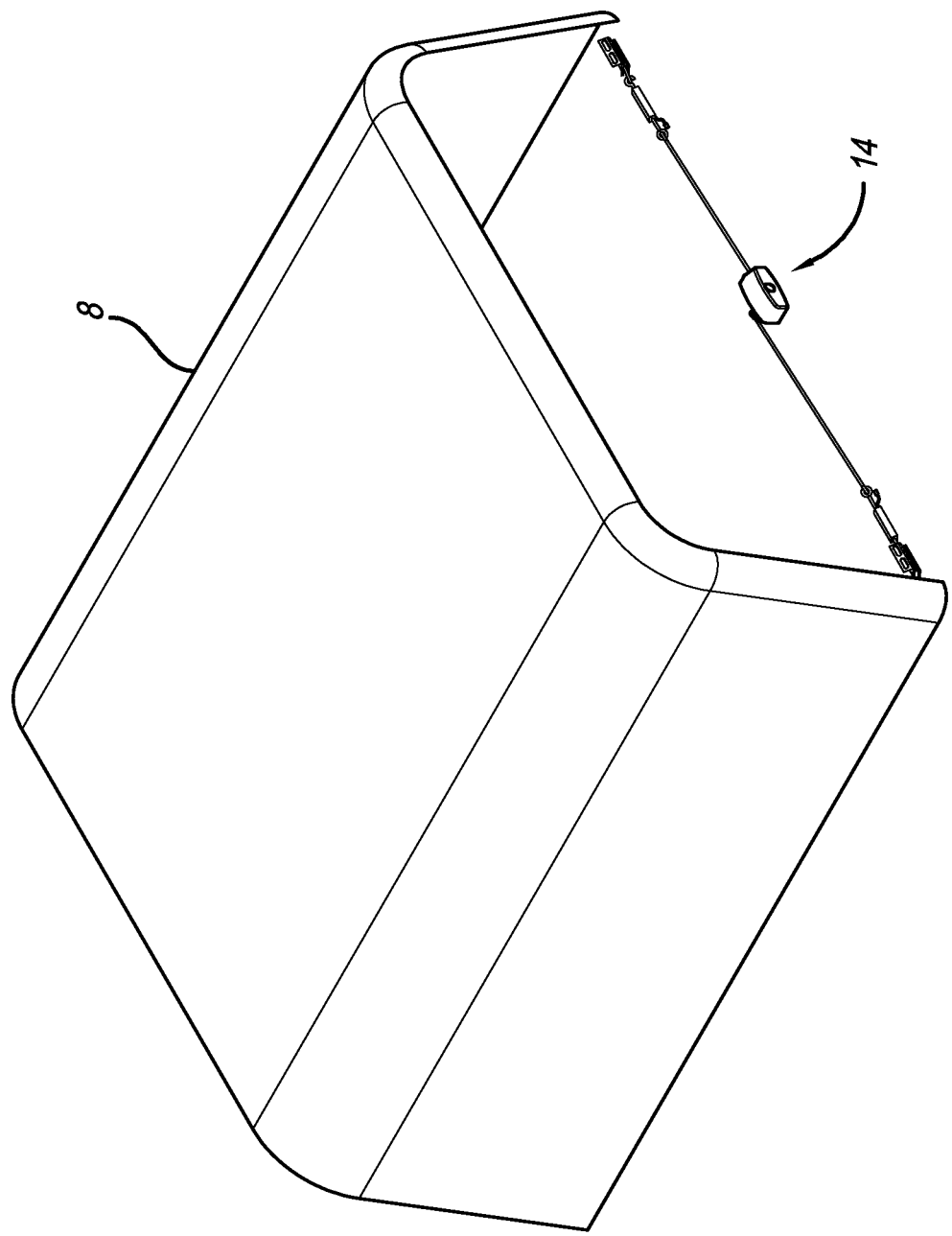
FIG. 13 is another perspective view of the cap with the lift door removed for demonstrative purpose to view the latch assembly.
Figure 14:
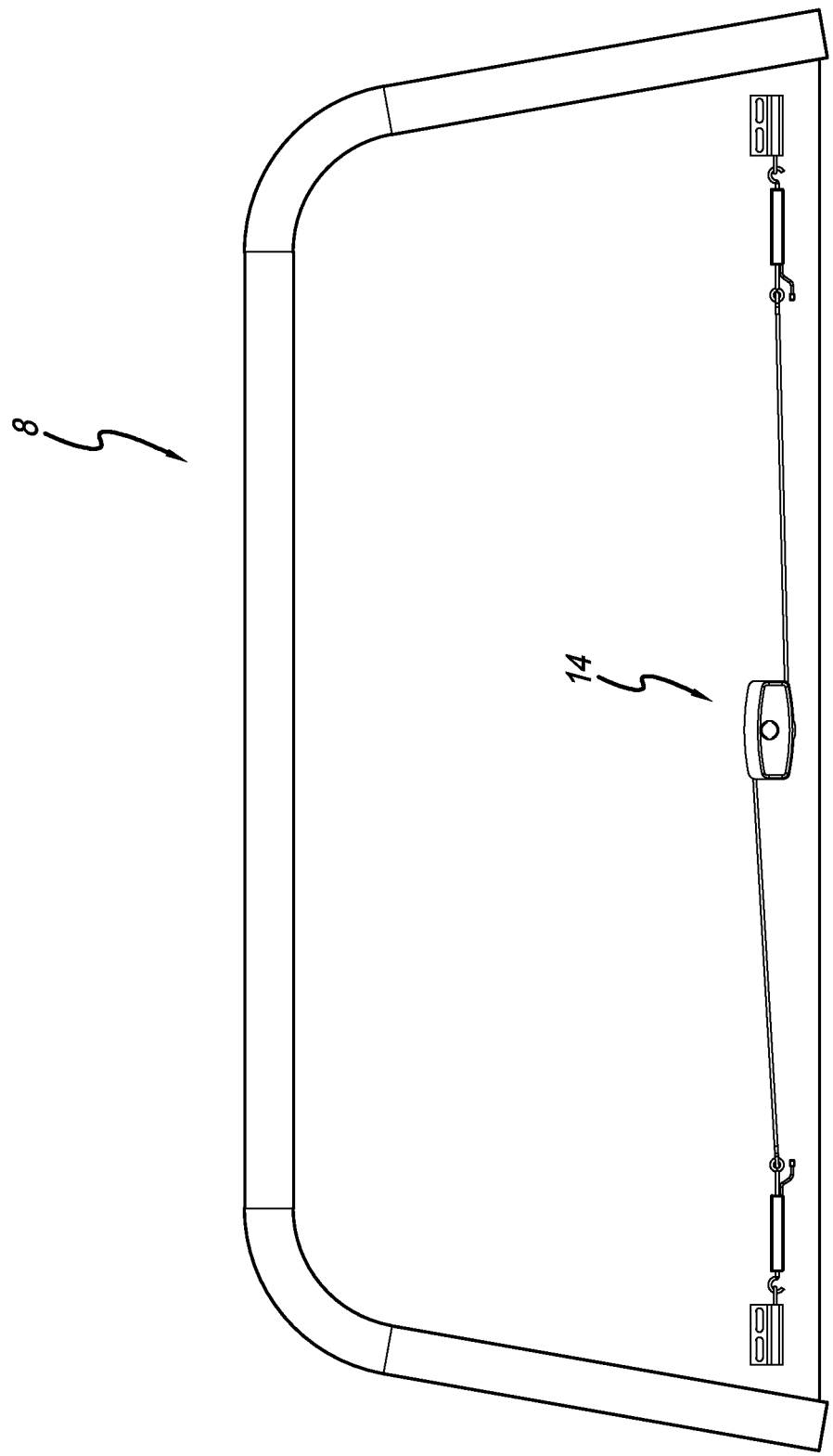
FIG. 14 is a rear view of the of the cap showing the latch assembly.

The perspective view of cap 8 shown in FIG. 13 is similar to that of FIG. 12 except with door 12 removed for demonstrative purposes allowing a view of latch assembly 14. (See also FIGS. 3 and 4.) An end view of cap 8 is shown in FIG. 14. Similar to that shown in FIG. 13, door 12 is also moved to show the relative positioning of latch assembly 14 with respect to the rest of the structure.

Figure 15:
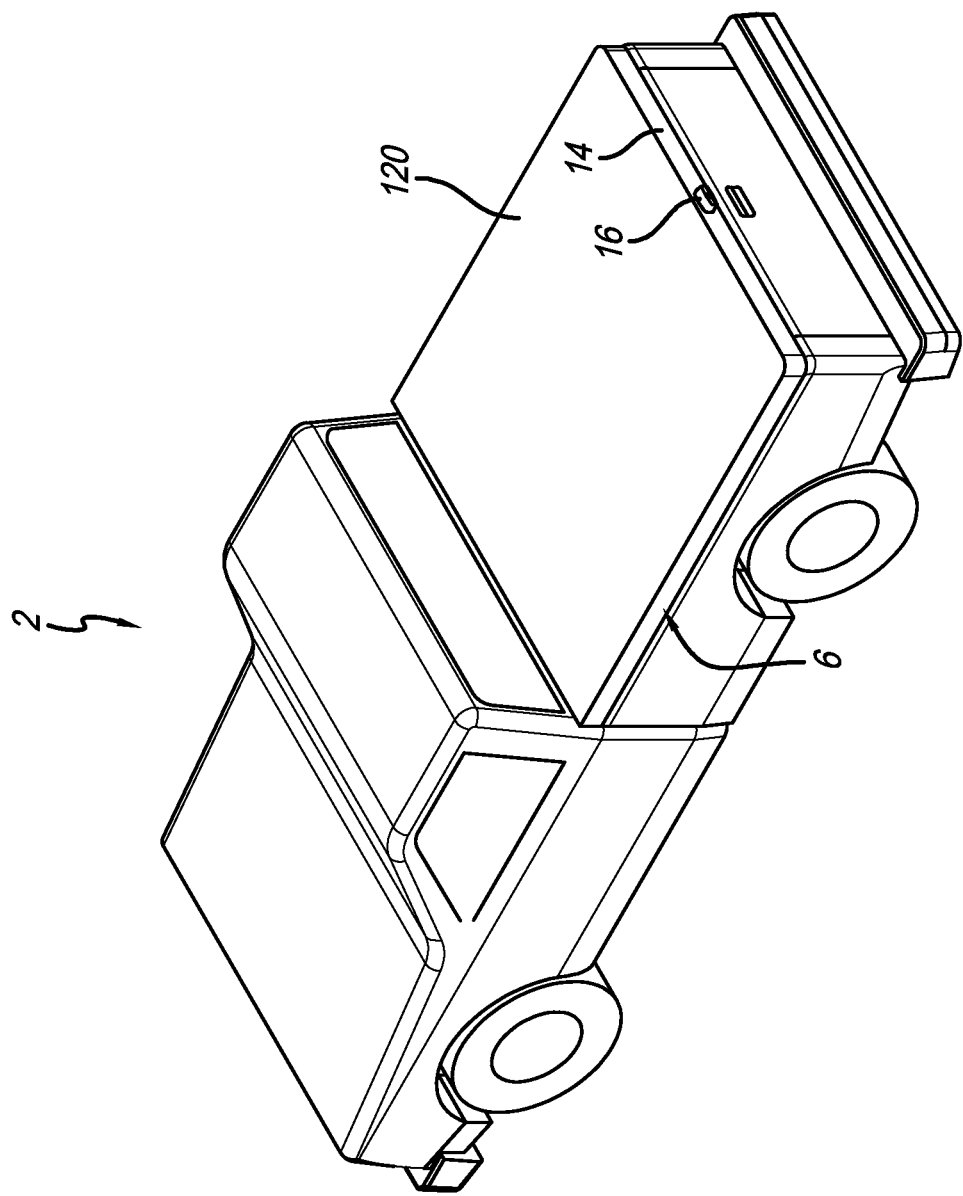
FIG. 15 is a rear perspective view of the pickup truck with a tonneau cover covering the bed section.
Figure 16:
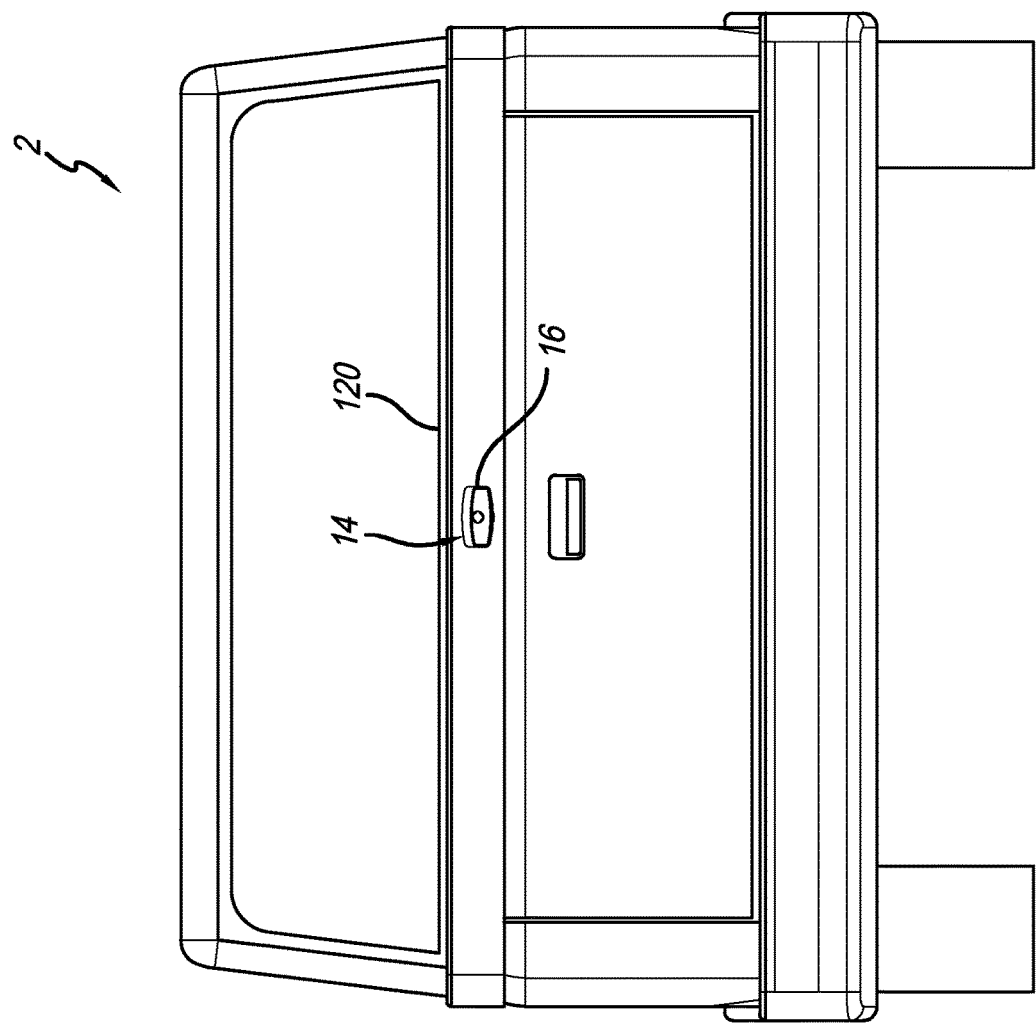
FIG. 16 is a rear view of the pickup truck with the tonneau cover covering the bed section.
Figure 17:
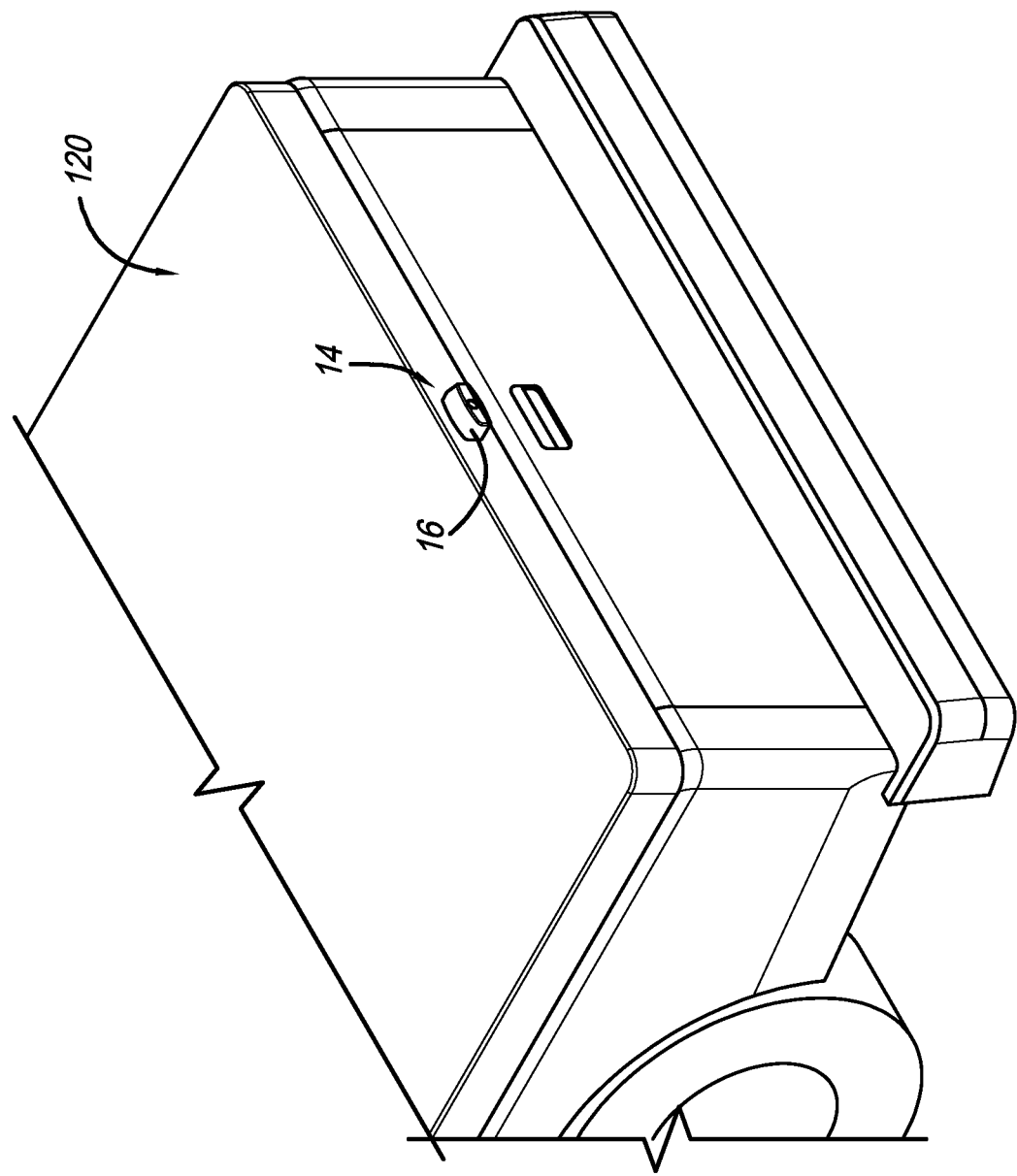
FIG. 17 is a rear perspective detail view of the bed section portion of the pickup truck with the tonneau cover covering the bed section.

Latch assembly 14 is not limited to use on just truck caps such as cap 8—it may also be used with tonneau covers such as cover 120 shown in FIGS. 15, 16, and 17. In this illustrative embodiment, truck 2 may include cover 120 that shrouds bed 6 and is latched in place using latch assembly 14 in the same manner as previously described with respect to FIGS. 1-14.

The figures and descriptions provided herein may have been simplified to illustrate aspects that are relevant for a clear understanding of the herein described devices, systems, and methods, while eliminating, for the purpose of clarity, other aspects that may be found in typical devices, systems, and methods. Those of ordinary skill may recognize that other elements and/or operations may be desirable and/or necessary to implement the devices, systems, and methods described herein. Because such elements and operations are well known in the art, and because they do not facilitate a better understanding of the present disclosure, a discussion of such elements and operations may not be provided herein. However, the present disclosure is deemed to inherently include all such elements, variations, and modifications to the described aspects that would be known to those of ordinary skill in the art.

Although certain embodiments have been described and illustrated in exemplary forms with a certain degree of particularity, it is noted that the description and illustrations have been made by way of example only. Numerous changes in the details of construction, combination, and arrangement of parts and operations may be made. Accordingly, such changes are intended to be included within the scope of the disclosure, the protected scope of which is defined by the claims.

What is claimed is:

1. A pick-up truck bed cover comprising:
a handle assembly;
wherein the handle assembly includes a key cylinder and a switch;
first and second rods in communication with the key cylinder from the handle assembly and extending in opposite directions;
first and second latches at opposite sides of the truck bed cover;
wherein the first latch comprises a first latch arm and the second latch comprises a second latch arm;
an electronic release assembly attached to the truck bed cover to selectively secure and release the truck bed cover to and from a truck;
wherein the electronic release assembly comprises:
first and second electronic actuators;
wherein the first electronic actuator includes a pull rod that extends exterior of the first electronic actuator;
wherein the second electronic actuator includes a pull rod that extends exterior of the second electronic actuator and extends opposite the pull rod of the first electronic actuator;
wherein the pull rod of the first electronic actuator is attached to the first latch arm;
wherein the pull rod of the second electronic actuator is attached to the second latch arm;
wherein the pull rod of the first electronic actuator is configured to selectively move the first latch arm;
wherein the pull rod of the second electronic actuator is configured to selectively move the second latch arm;
wherein the handle assembly is centrally located between the first and second electronic actuators;
wherein the first electronic actuator includes a mechanical override rod that extends exterior of the first electronic actuator axially opposed to the pull rod of the first electronic actuator;
wherein the second electronic actuator includes a mechanical override rod that extends exterior of the second electronic actuator axially opposed to the pull rod of the second electronic actuator;
wherein the first rod is coupled to the mechanical override rod of the first electronic actuator;
wherein the second rod is coupled to the mechanical override rod of the second electronic actuator; and
wherein the switch is configured to send a signal to the first and second electronic actuators to cause the first and second latch arms to move; and
wherein, if the first or second electronic actuators do not move the first latch arm or the second latch arm, respectively, the handle assembly can manually operate to move the first latch arm or the second latch arm, respectively, via the mechanical override rod of the first electronic actuator or the mechanical override rod of the second electronic actuator, respectively.

2. The pick-up truck bed cover of claim 1, wherein the first and second rods and the first and second electronic actuators also serve as part of a mechanical override system that selectively unlatches at least a portion of the truck bed cover from a truck bed section; wherein the mechanical override system comprises: a link operatively coupled to the handle assembly and configured to rotate relative thereto; wherein the first and second rods are each located on opposite sides of a pivot point on the link so that as the link rotates, the first and second rods move in opposite directions; and wherein rotation of the link in a first direction moves the first and second rods to mechanically move the mechanical override rod of the first electronic actuator and the mechanical override rod from the second electronic actuator to move the first and second latch arms.

3. The pick-up truck bed cover of claim 2, wherein the key cylinder assembly is configured to manually lock and unlock the handle assembly.

4. The pick-up truck bed cover of claim 1, wherein the pick-up truck bed cover is selected from the group consisting of a tonneau cover and a cap.

5. The pick-up truck bed cover of claim 1, wherein at least a portion of the handle assembly is located on an exterior side of the truck bed cover.

6. A truck bed cover comprising:
a release assembly that includes:
a handle;
a first rod extending from the handle;
a first electronic actuator;
wherein the first electronic actuator includes a pull rod that extends exterior of the first electronic actuator;
wherein the first electronic actuator includes a mechanical override rod that extends exterior of the first electronic actuator axially opposed to the pull rod of the first electronic actuator;
a first latch located at one side of the truck bed cover;
wherein the first latch comprises a first latch arm;
wherein the pull rod of the first electronic actuator is attached to the first latch arm;
wherein the first rod is coupled to the mechanical override rod of the first electronic actuator;
wherein the first latch is coupled to the first latch arm; and
wherein the pull rod of the first electronic actuator is configured to selectively move the first latch arm coupled to the first latch; and
wherein, if the first electronic actuator does not move the first latch arm, the handle assembly can manually operate to move the first latch arm via the mechanical override rod of the first electronic actuator.

7. The pick-up truck bed cover of claim 6, further comprising a second rod extending from the handle, a second electronic actuator, wherein the second electronic actuator includes a pull rod, wherein the mechanical override rod of the second electronic actuator is located exterior of the second electronic actuator, a second latch arm, wherein the pull rod of the second electronic actuator is attached to the second latch arm, wherein the second rod is coupled to the mechanical override rod of the second electronic actuator, a second latch located at a side of the truck bed cover opposite the first latch, wherein the second latch is coupled to the second latch arm, wherein the pull rod of the second electronic actuator is configured to selectively move the second latch arm coupled to the second latch, wherein a mechanical override system selectively unlatches at least a portion of the truck bed cover from a truck bed section, and the mechanical override system includes a link operatively coupled to the handle and rotatable relative thereto.

8. The pick-up truck bed cover of claim 7, wherein the first and second rods are each located on opposite sides of a pivot point on the link so that as the link rotates, the first and second rods move in opposite directions.

9. The pick-up truck bed cover of claim 8, wherein rotation of the link in a first direction moves the first and second rods to manually move the mechanical override rods of the first and second electronic actuators, respectively, to move the first and second latch arms, respectively, which are coupled to the first and second latches, respectively.

10. The truck bed cover of claim 7, wherein the pull rods of the first and second electronic actuators are each electronically moved which moves the first and second latches, respectively, to an unlatched condition.

11. The truck bed cover of claim 7, wherein the first and second rods move the mechanical override rods of the first and second electronic actuators, respectively, to move the first and second latches, respectively, to an unlatched condition.

12. The pick-up truck bed cover of claim 6, wherein the first and second rods, the first and second electronic actuators, and the first and second latches are located interior of the truck bed section opposite an exterior side of the truck bed cover.

13. The pick-up truck bed cover of claim 6, wherein at least a portion of the handle is located on an exterior side of the truck bed cover.

14. The truck bed cover of claim 6, wherein the truck bed cover is selected from the group consisting of a tonneau cover and a truck cap.

15. A truck bed cover comprising:
a release assembly that includes:
a first rod;
a first electronic actuator;
wherein the first rod is coupled to the first electronic actuator; and
a first latch located at one side of the truck bed cover;
wherein the first latch comprises a first latch arm;
wherein the first latch includes a latch arm;
wherein the first electronic actuator is configured to selectively move the latch arm of the first latch;
wherein the first electronic actuator includes a pull rod that extends exterior of the second electronic actuator and extends opposite the pull rod of the first electronic actuator;
wherein the pull rod of the first electronic actuator is coupled to the latch arm of the first latch;

wherein the first electronic actuator includes a mechanical override rod that extends exterior of the first electronic actuator actually opposed to the pull rod of the first electronic actuator;
wherein the mechanical override rod of the first electronic actuator is coupled to the first rod; and
wherein, if the first electronic actuator does not move the first latch arm, the handle assembly can manually operate to move the first latch arm via the mechanical override rod of the first electronic actuator.

16. The pick-up truck bed cover of claim 15, further comprising a second rod extending in an opposite direction from the first rod, a second electronic actuator, wherein the second rod is coupled to the second electronic actuator, a second latch located at a side of the truck bed cover opposite the first latch, wherein the second latch includes a latch arm, wherein the second electronic actuator is configured to selectively move the latch arm of the second latch, wherein the second electronic actuator includes a pull rod wherein the pull rod of the second electronic actuator is coupled to the latch arm of the second latch, wherein a mechanical override rod of the second electronic actuator is located exterior of the second electronic actuator, and wherein the mechanical override rod of the second electronic actuator is coupled to the second rod.

17. The pick-up truck bed cover of claim 16, wherein the first and second rods serve as part of a mechanical override system, wherein the mechanical override system selectively unlatches at least a portion of the truck bed cover from the truck bed section, the mechanical override system includes a rotatable link.

18. The pick-up truck bed cover of claim 17, wherein the first and second rods are each located on opposite sides of a pivot point on the link so that as the link rotates, the first and second rods move in opposite directions.

19. The pick-up truck bed cover of claim 16, wherein the mechanical override rod of the second electronic actuator includes an eyelet located exterior of the second electronic actuator and opposite of the second electronic actuator, wherein the second rod includes a hook that couples to the eyelet to couple to the mechanical override rod of the second electronic.

20. A truck bed cover comprising:
a panel door;
wherein the panel door includes a release assembly;
wherein the release assembly includes:
an electronic actuator that includes a pull rod and a mechanical override rod extending therefrom;
wherein the pull rod extends from the electronic actuator;
wherein the mechanical override rod extends from the electronic actuator axially opposite the pull rod;
a latch arm connected to a rotary latch catch;
wherein a hook of the pull rod and located external of the electronic actuator connects through an opening in the latch arm;
wherein a hook of a rod connects to an eyelet of the mechanical override rod;
wherein the eyelet is located external of the electronic actuator;
wherein the electronic actuator moves the pull rod to move the latch arm; and
wherein if the electronic actuator does not move the latch arm, movement of the mechanical override rod pulls on the pull rod which is part of the first side of the pull rod to move the latch arm.

* * * * *